United States Patent
Weiss et al.

(10) Patent No.: US 10,473,205 B2
(45) Date of Patent: Nov. 12, 2019

(54) METAL COMPRESSION RINGS

(71) Applicant: HEWLETT-PACKARD DEVELOPMENT COMPANY, L.P., Houston, TX (US)

(72) Inventors: Asa Weiss, Vancouver, WA (US); Kynan Lon Church, Vancouver, WA (US); Andrzej Romanski, Vancouver, WA (US); Jeffery S. Mathena, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 236 days.

(21) Appl. No.: 15/656,221

(22) Filed: Jul. 21, 2017

(65) Prior Publication Data
US 2019/0024774 A1 Jan. 24, 2019

(51) Int. Cl.
| | |
|---|---|
| F16H 57/00 | (2012.01) |
| H02K 7/10 | (2006.01) |
| F16H 55/06 | (2006.01) |
| F16H 55/17 | (2006.01) |
| F16H 55/48 | (2006.01) |
| F16H 37/02 | (2006.01) |
| F16H 7/02 | (2006.01) |
| F16H 1/06 | (2006.01) |

(52) U.S. Cl.
CPC .......... *F16H 57/0025* (2013.01); *F16H 1/06* (2013.01); *F16H 7/02* (2013.01); *F16H 37/02* (2013.01); *F16H 37/021* (2013.01); *F16H 55/06* (2013.01); *F16H 55/17* (2013.01); *F16H 55/48* (2013.01); *H02K 7/1004* (2013.01)

(58) Field of Classification Search
CPC ......... Y10T 403/7056; Y10T 403/7069; F16D 1/095; F16D 1/093; B60B 37/10
USPC .......................................................... 474/198
See application file for complete search history.

(56) References Cited

U.S. PATENT DOCUMENTS

| | | | | |
|---|---|---|---|---|
| 3,051,010 A | * | 8/1962 | Blomgren | A01B 71/00 474/198 |
| 3,063,743 A | * | 11/1962 | Kylen | F16D 1/095 29/421.1 |
| 3,434,303 A | * | 3/1969 | Leyer | F16D 1/05 464/71 |
| 3,610,066 A | * | 10/1971 | Rychlik | F16H 55/06 74/434 |
| 3,782,841 A | * | 1/1974 | Winckelhaus | B60B 27/0026 403/373 |
| 3,830,577 A | * | 8/1974 | Rampe | F16D 1/072 403/378 |

(Continued)

OTHER PUBLICATIONS

Face Tapped Clamping Hubs, < https://www.servocity.com/770-clamping-hubs >.

*Primary Examiner* — Henry Y Liu
(74) *Attorney, Agent, or Firm* — HP Inc. Patent Department

(57) ABSTRACT

An example shaft assembly includes a metal shaft and a plastic ring element interference-fitted to the metal shaft. The plastic ring element includes a footing proximate to an outer diameter of the metal shaft. The shaft assembly also includes a metal compression ring interference-fitted to the footing of the plastic ring element to apply a radial locking force between the footing and the metal shaft.

15 Claims, 10 Drawing Sheets

(section A-A)

(56) References Cited

U.S. PATENT DOCUMENTS

| | | | | |
|---|---|---|---|---|
| 3,845,668 A * | 11/1974 | Underwood | F16H 1/20 74/412 R | |
| 3,871,241 A * | 3/1975 | Pestka | D06F 58/08 474/135 | |
| 3,930,362 A * | 1/1976 | Cielaszyk | G04B 19/02 368/185 | |
| 3,958,888 A * | 5/1976 | Mullenberg | F16D 1/093 403/13 | |
| 3,972,636 A * | 8/1976 | Peter | F16D 1/095 403/374.4 | |
| 3,998,563 A * | 12/1976 | Kloren | F16B 3/06 403/370 | |
| 4,110,054 A * | 8/1978 | Moeller, Jr. | F16D 1/087 403/373 | |
| 4,177,685 A * | 12/1979 | DeLancey | F16H 55/48 403/362 | |
| 4,268,185 A * | 5/1981 | Mullenberg | F16D 1/093 403/16 | |
| 5,270,999 A * | 12/1993 | Chessman | G11B 17/02 720/722 | |
| 5,402,207 A * | 3/1995 | Michlin | G03G 15/751 399/117 | |
| 5,496,124 A * | 3/1996 | Bareis | F16C 3/28 403/15 | |
| 5,647,685 A * | 7/1997 | Fukui | F16D 1/093 403/370 | |
| 6,134,976 A * | 10/2000 | Elsing | G01M 13/02 403/370 | |
| 6,225,721 B1 * | 5/2001 | Braun | F16D 1/0858 310/67 R | |
| 6,375,274 B1 * | 4/2002 | Morris | B60B 3/001 301/111.01 | |
| 7,523,887 B2 * | 4/2009 | Ishikawa | G11B 23/044 242/348 | |
| 2003/0067213 A1 * | 4/2003 | Lin | B60B 5/02 301/64.704 | |
| 2003/0085611 A1 * | 5/2003 | Markling | B60B 5/02 301/64.701 | |
| 2004/0262984 A1 * | 12/2004 | Morris | B60B 3/001 301/111.01 | |
| 2005/0252327 A1 * | 11/2005 | Shogren | F16D 1/0858 74/431 | |
| 2006/0053917 A1 * | 3/2006 | Asari | F16H 55/06 74/423 | |
| 2009/0052821 A1 * | 2/2009 | Hartmann | B60S 1/166 384/295 | |
| 2014/0238171 A1 * | 8/2014 | Kastrup | F16H 57/0025 74/434 | |
| 2016/0289878 A1 * | 10/2016 | Kambara | D05B 57/26 | |

* cited by examiner (section A-A)

(section B-B)

(section A-A)

(section D-D)

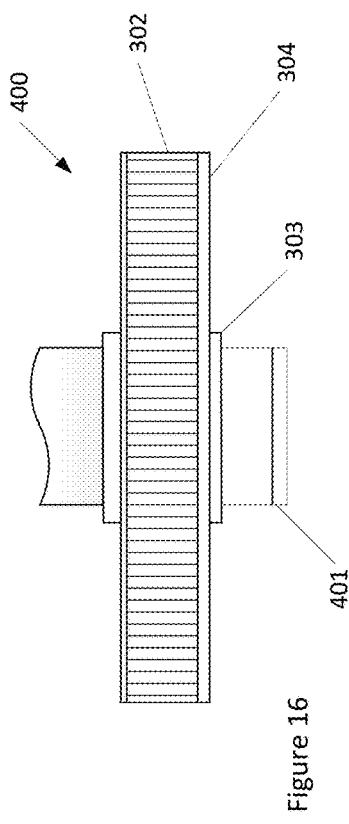
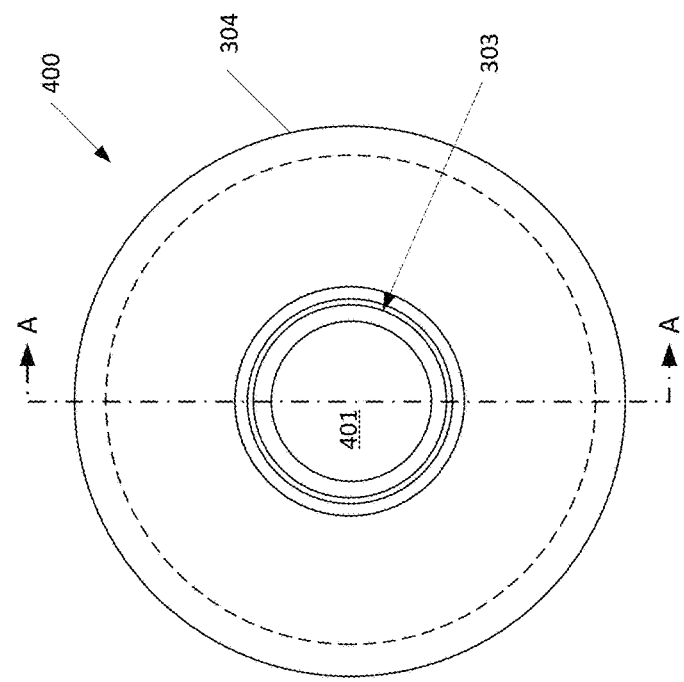
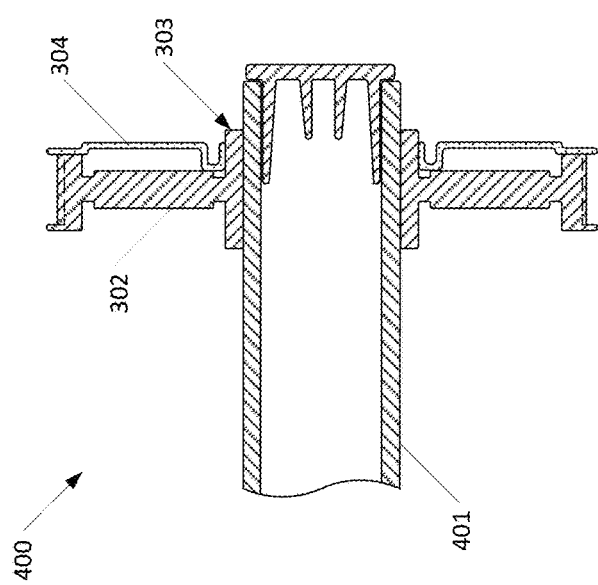

METAL COMPRESSION RINGS

BACKGROUND

Conventional press-fit methods for locking plastic gears and pulleys to rotary shafts, to resist slippage under torque, suffer from material creep and differential thermal expansion problems that eventually result in slipping. Other approaches, such as knurling and locking screws can result in weakening and distortion of the rotary shaft, especially if the shaft is hollow.

BRIEF DESCRIPTION OF THE DRAWINGS

For a more complete understanding of various examples, reference is now made to the following description taken in connection with the accompanying drawings in which:

FIG. 14 is a cross-section of an example shaft assembly;

FIG. 15 is an axial view of the example shaft assembly of FIG. 14;

FIG. 16 is a top view of the example shaft assembly of FIG. 14;

DETAILED DESCRIPTION

Various examples described herein illustrate the design and application of metal compression rings to apply a radial locking force between plastic gears and pulleys (collectively "plastic ring elements") and the rotary metal shafts on which the plastic ring elements are mounted. In one example, shaft assembly includes a metal shaft, a plastic ring element with a flange-shaped footing that is interference-fitted to the metal shaft and a metal compression ring that is interference-fitted over the footing to apply a radial locking force between the footing and the metal shaft to prevent torque slippage under load.

Figure 3:
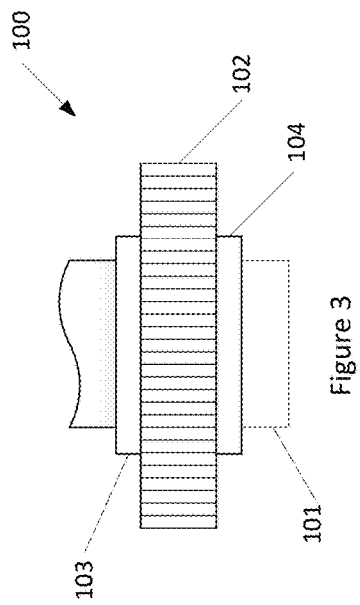
FIG. 3 is a top view of the example assembly of FIG. 1.
Figure 2:
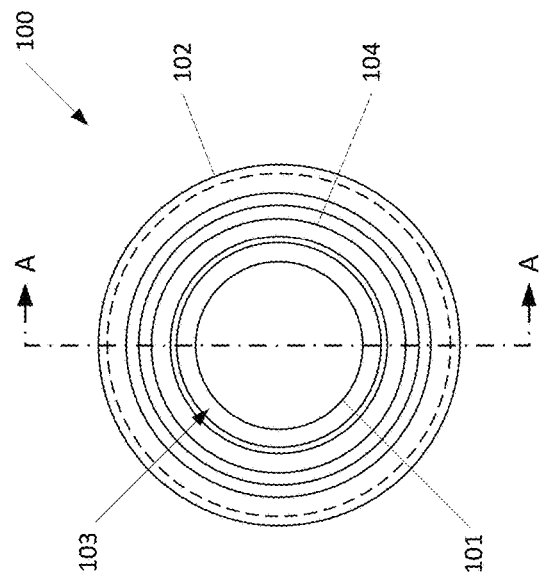
FIG. 2 is an axial view of the example shaft assembly of FIG. 1.
Figure 1:
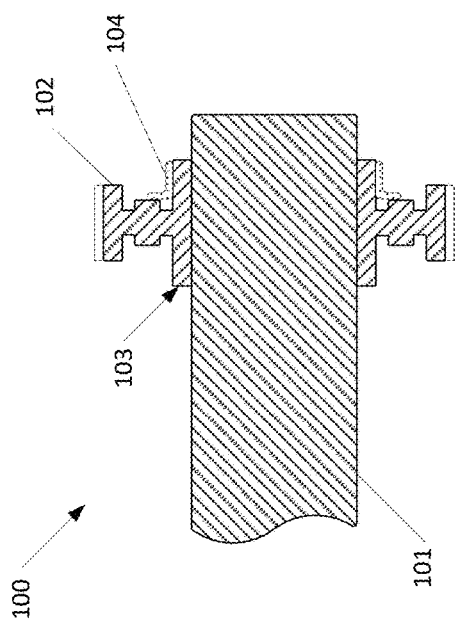
FIG. 1 is a cross-sectional view of an example shaft assembly.

Referring now to the figures, FIG. 1 is a cross-sectional view of an example shaft assembly 100 illustrating section A-A of FIG. 2, which is an axial view of the example shaft assembly 100, and FIG. 3 is a top view of the example shaft assembly 100. The example shaft assembly 100 includes a metal shaft 101, which may be a solid shaft as illustrated in FIG. 1. In other examples, metal shaft 101 may also be a hollow shaft as described in greater detail below. Metal shaft 101 may be fabricated from steel, stainless steel, aluminum or any other metal suitable for use as a rotary shaft.

Shaft assembly 100 also includes a plastic ring element 102, which is a plastic gear in the example illustrated in FIGS. 1-3. Plastic ring element 102 (hereinafter referred to as plastic gear 102) has a flange-shaped footing 103 with an inner diameter that is less than the outer diameter of metal shaft 101. The resulting interference creates a press-fit between plastic gear 102 and metal shaft 101 when the parts are assembled, due to the relative compressibility and deformability of the material used for the plastic gear 102.

In some examples, and without limitation, plastic gear 102 may be fabricated from a thermoplastic material such as nylon, acetal, polycarbonate, polyester, polyurethane, polyphenylene sulfide, a polymer elastomer, or the like. In other examples, without limitation, plastic gear 102 may be fabricated from a thermosetting material such as a phenolic, polyimide, or the like.

Example shaft assembly 100 also includes a metal compression ring 104. In one example, as illustrated in FIG. 1, metal compression ring 104 may have an L-shaped cross-section. Metal compression ring 104 may be fabricated from any suitable metal such as steel, stainless steel, aluminum or the like. Preferably, metal compression ring 104 is fabricated by draw-forming or stamping to reduce manufacturing costs, but any other method known in the art may be used.

Metal compression ring 104 has an inner diameter that is less than the outer diameter of the footing 103, creating an interference fit between the footing 103 and the metal compression ring 104. Accordingly, when the metal compression ring is pressed onto the footing 103, the footing 103 is compressed between the metal shaft 101 and the metal compression ring 104, creating a radial locking force between the footing 103 and the metal shaft 101 that resists slippage under torque. In various examples, depending on the physical properties of the material selected for the plastic gear 102, including material creep under compression and coefficient of thermal expansion, the amount of interference, and hence the compression of the footing 103, is selected to be greater than an expected amount of material creep over the expected useful life of the assembly and the relative expansion or shrinkage of the metal shaft 101, the footing 103, and the metal compression ring 104 over the expected operating temperature range of the shaft assembly 100.

Figure 4:
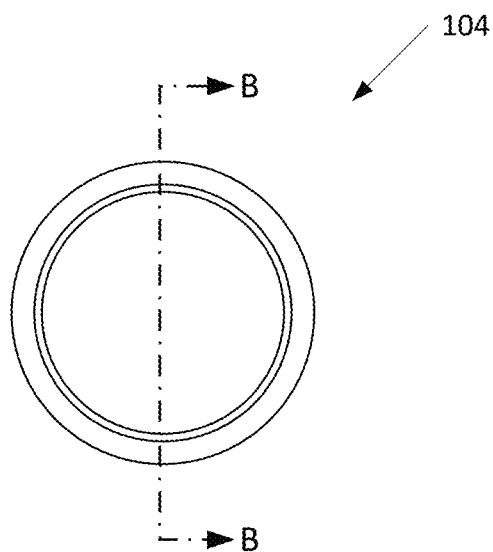
FIG. 4 is an axial view of an example metal compression ring.
Figure 5:
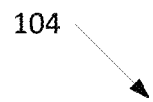
FIG. 5 is a cross-sectional view of the example metal compression ring of FIG. 4.

FIG. 4 illustrates an axial view of metal compression ring 104, and FIG. 5 illustrates a cross-sectional view of section B-B of FIG. 4. In some examples, without limitation, metal compression rings such as metal compression ring 104 may be used in shaft assemblies typical of printers (e.g., laser and inkjet printers) and copiers. In such applications, the metal compression rings may have inner diameters on the order of approximately 10-20 millimeters and widths on the order of approximately 5 millimeters. However, metal compression rings of any inner diameter and width appropriate to a specific application are contemplated within the present disclosure.

Figure 8:
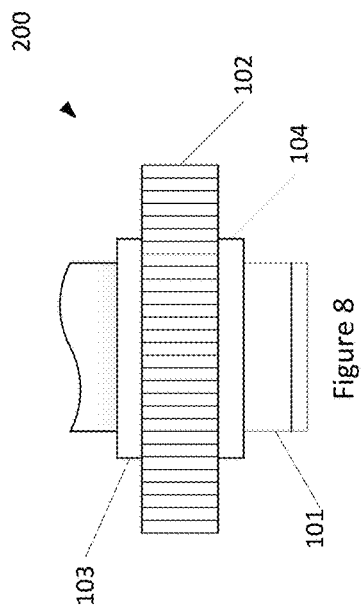
FIG. 8 is a top view of the example shaft assembly of FIG. 6.
Figure 7:
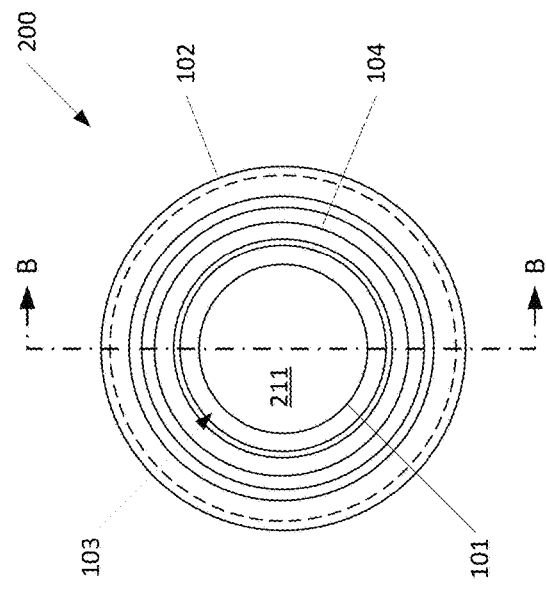
FIG. 7 is an axial view of the example shaft assembly of FIG. 6.
Figure 6:
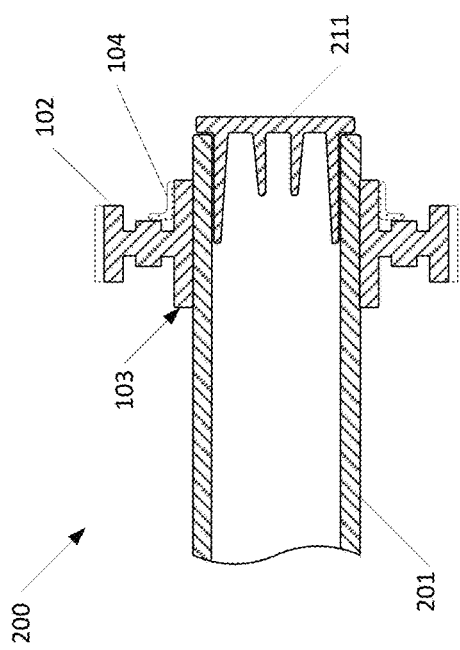
FIG. 6 is a cross-sectional view of an example shaft assembly with a hollow metal shaft.

Referring now to FIGS. 6-8, FIG. 6 is a cross-sectional view of an example shaft assembly 200 illustrating section C-C of FIG. 7, which is an axial view of the example shaft assembly 200, and FIG. 8 is a top view of the example shaft assembly 200. The example shaft assembly 200 may be similar in all respects to example shaft assembly 100 with the exception that shaft assembly 200 includes a hollow metal shaft 201 and may include an end-plug 211. Accordingly, the components of shaft assembly 200 that are common to shaft assembly 100 will not be described in further detail. With respect to hollow metal shaft 201, it will be appreciated that a hollow shaft, such as metal shaft 201, will have a lower moment of inertia than a solid shaft of equal diameter fabricated of the same material. Accordingly, a hollow shaft may be desired in applications, such as high-speed printing and copying, which may have rapid accelerations and decelerations in the transport mechanisms for scanning heads, print heads, and print media. Additionally, an end-plug, such as end-plug 211, may provide mechanical support to the end of metal shaft 201 and/or may prevent the accumulation of dust and debris within the hollow metal shaft 201.

Figure 11:
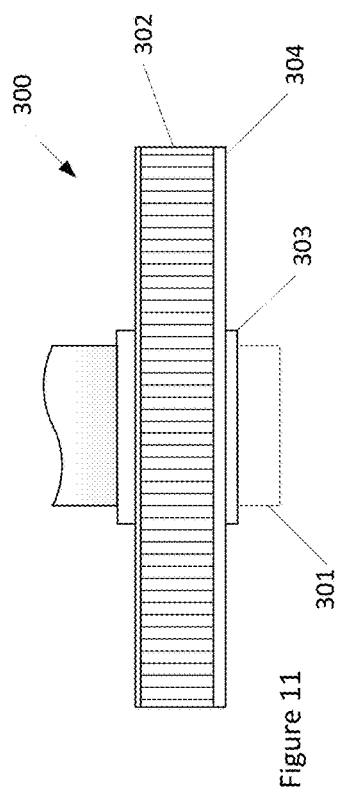
FIG. 11 is a top view of the example shaft assembly of FIG. 9.
Figure 10:
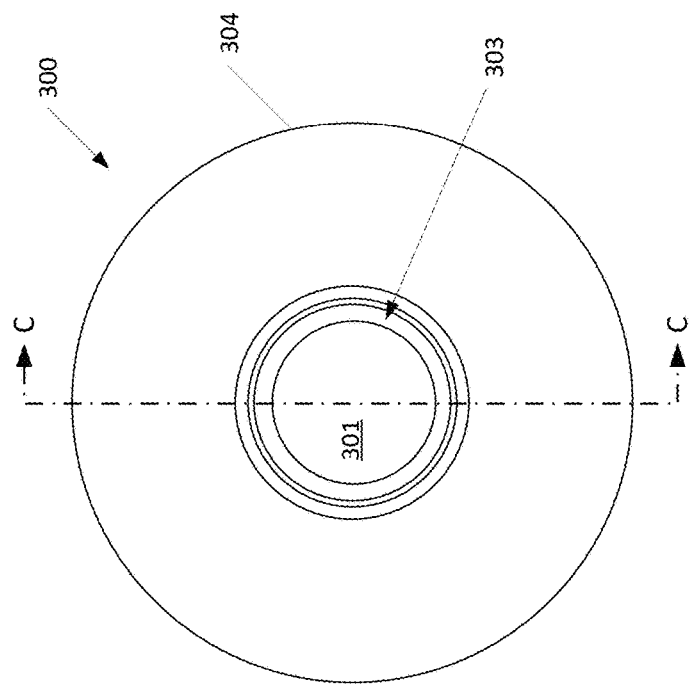
FIG. 10 is an axial view of the example shaft assembly of FIG. 9
Figure 9:
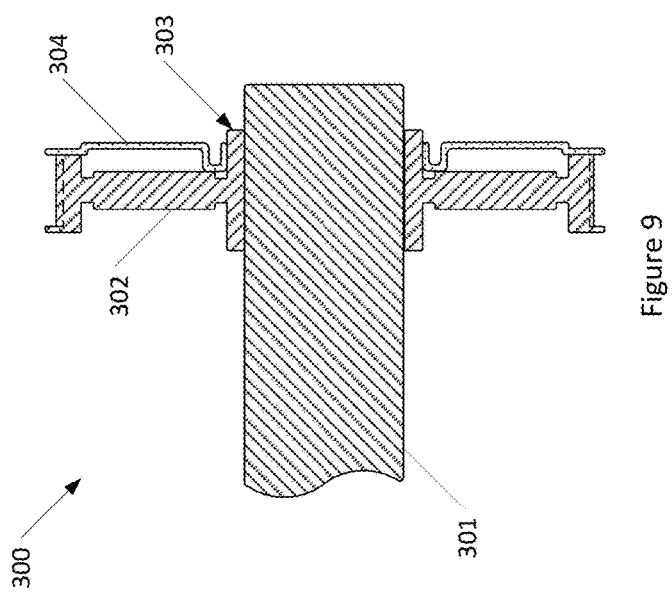
FIG. 9 is a cross-sectional view of another example shaft assembly.

Referring now to FIGS. 9-11, FIG. 9 is a cross-sectional view of an example shaft assembly 300 illustrating section D-D of FIG. 10, which is an axial view of the example shaft assembly 300, and FIG. 11 is a top view of the example shaft assembly 300. Example shaft assembly 300 includes a solid metal shaft 301 that in all respects may be similar to metal shaft 101 and, accordingly, will not be described in greater detail.

Example shaft assembly 300, also includes a plastic ring element 302, a plastic pulley in the example illustrated in FIGS. 9-11. Plastic ring element 302 (hereinafter referred to as plastic pulley 302) has a flange-shaped footing 303 with an inner diameter that is less than the outer diameter of metal shaft 301. The resulting interference creates a press-fit between plastic pulley 302 and metal shaft 301 when the parts are assembled, due to the relative compressibility and deformability of the material used for the plastic pulley 302.

In some examples, and without limitation, plastic pulley 302 may be fabricated from a thermoplastic material such as nylon, acetal, polycarbonate, polyester, polyurethane, polyphenylene sulfide, a polymer elastomer, or the like. In other examples, without limitation, plastic pulley 302 may be fabricated from a thermosetting material such as a phenolic, polyimide, or the like.

Figure 13:
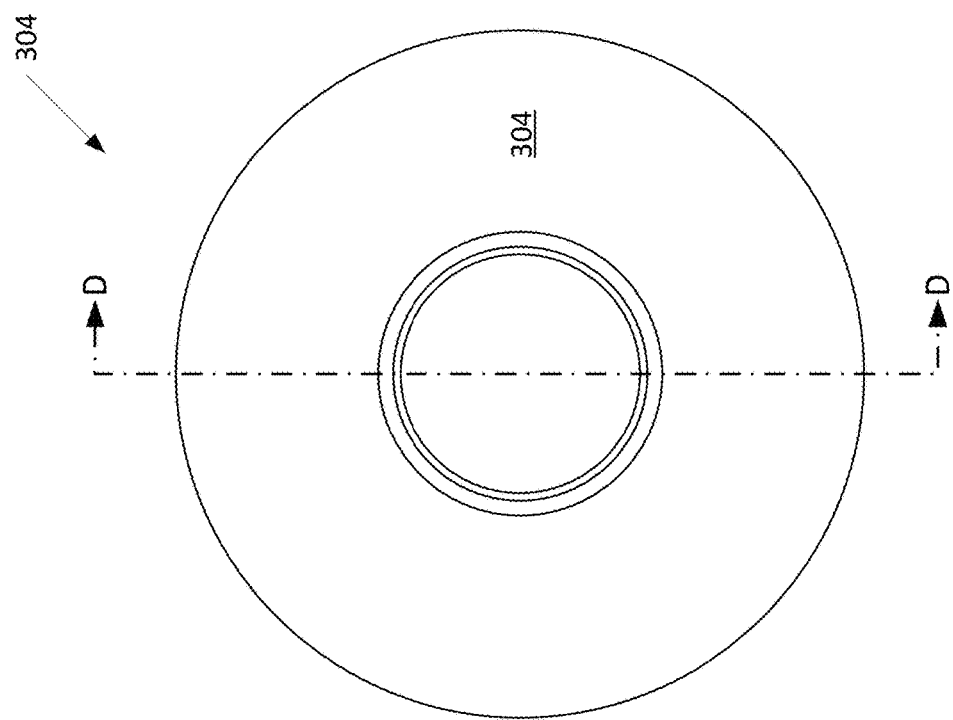
FIG. 13 is a plane view of an example metal compression ring illustrating a surface receptive to a printed or applied optical rotary encoding disc.
Figure 12:
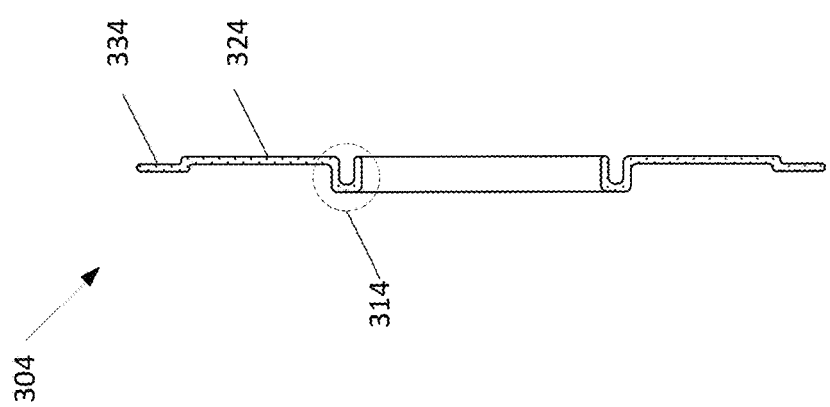
FIG. 12 is a cross-section illustrating a configuration of an example metal compression ring.

Example shaft assembly 300 also includes a metal compression ring 304. In one example, as illustrated in FIGS. 12 and 13, metal compression ring 304 may have a more complex shape than metal compression ring 104. Metal compression ring 304 may include an approximately U-shaped portion 314 defining an inner diameter of metal compression ring 304. Metal compression ring 304 may include a first linear portion 324 extending radially from the U-shaped portion 314 and offset from the U-shaped portion 314 away from a centerline of the plastic pulley 302. Metal compression ring 304 may further include a second linear portion 334 extending radially from the first linear portion 324 and offset from the first linear portion 324 towards a centerline of the plastic pulley 302. In one example, as illustrated in FIG. 9, the second linear portion 334 may form a race for the plastic pulley 302.

Metal compression ring 304 has an inner diameter that is less than the outer diameter of the footing 303, creating an interference fit between the footing 303 and the metal compression ring 304. Accordingly, when the metal compression ring 304 is pressed onto the footing 303, the footing 303 is compressed between the metal shaft 301 and the metal compression ring 304, creating a radial locking force between the footing 303 and the metal shaft 301 that resists slippage under torque. In various examples, depending on the physical properties of the material selected for the plastic pulley 302, including material creep under compression and coefficient of thermal expansion, the amount of interference, and hence the compression of the footing 303, is selected to be greater than an expected amount of material creep over time (e.g., the useful life of the assembly) and the relative expansion or shrinkage of the metal shaft 301, the footing 303, and the metal compression ring 304 over the expected operating temperature range of the shaft assembly 300.

As illustrated in FIG. 13, the axial view of metal compression ring 304, metal compression ring 304 has a large disc-like surface 344. In one example, this surface may be used to print or apply an optical rotary encoder disc (not shown) to detect and control the angular position or angular velocity of metal shaft 301.

Metal compression ring 304 may be fabricated from any suitable metal such as steel, stainless steel, aluminum or the like. Preferably, metal compression ring 304 is fabricated by draw-forming or stamping to reduce manufacturing costs, but any other method known in the art may be used.

Referring now to FIGS. 14-16, FIG. 14 is a cross-sectional view of an example shaft assembly 400 illustrating section F-F of FIG. 15, which is an axial view of the example shaft assembly 400, and FIG. 16 is a top view of the example shaft assembly 400. The example shaft assembly 400 may be similar in all respects to example shaft assembly 300 with the exception that shaft assembly 400 includes a hollow metal shaft 401 and may include an end-plug 411. Hollow metal shaft 401 and end-plug 411 may be similar in all respects to hollow metal shaft 201 and end-plug 211, respectively. Accordingly, the components of shaft assembly 400 that are common to shaft assembly 200 and shaft assembly 300 will not be described in further detail.

Figure 17:
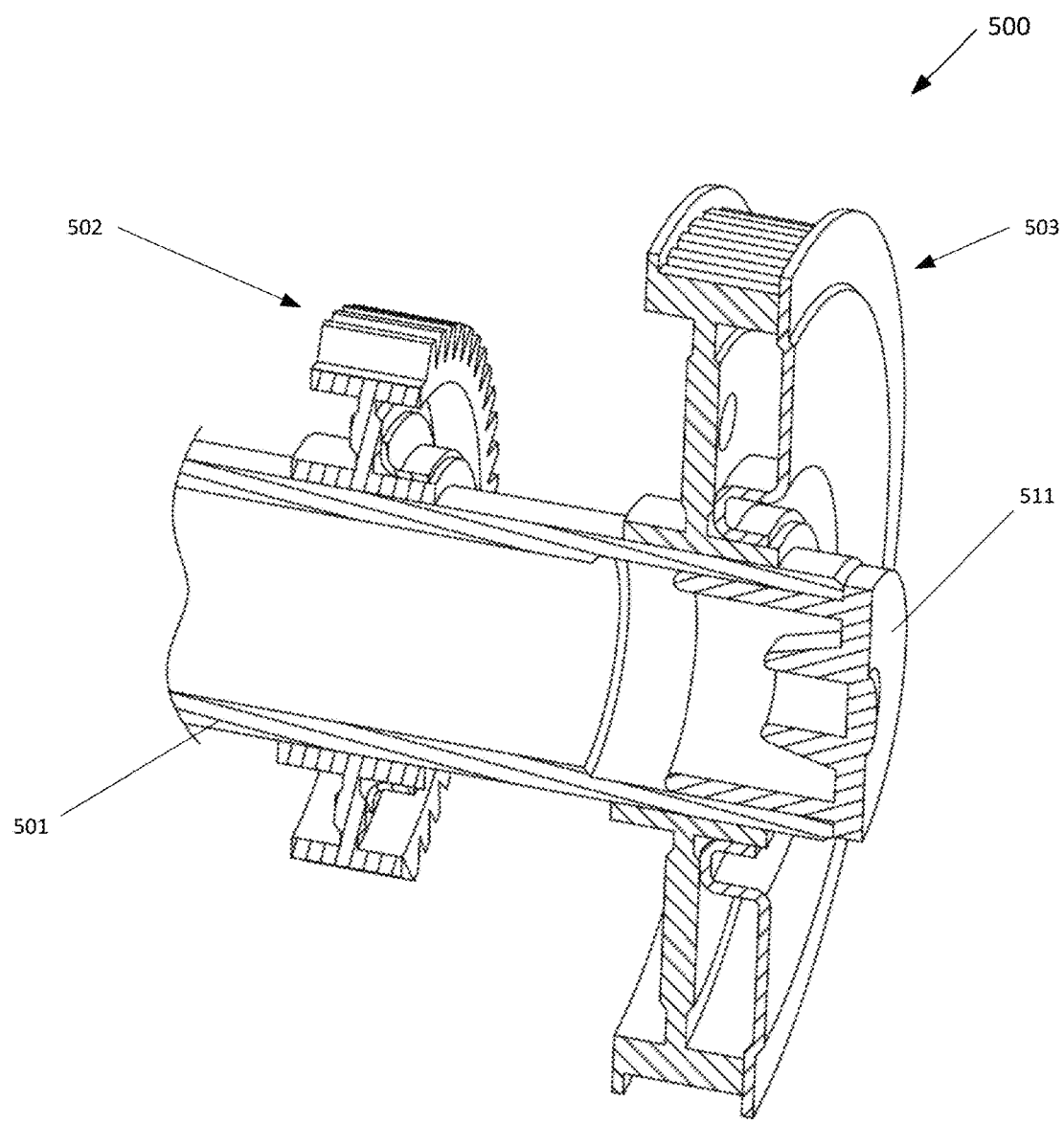
FIG. 17 is a perspective cross-sectional view of an example shaft assembly with a plurality of plastic ring elements.

Turning now to FIG. 17, there is illustrated a perspective cross-sectional view of an example shaft assembly 500. Shaft assembly 500 includes a hollow metal shaft 501 with and end-plug 511 that may provide mechanical support to the end of the hollow metal shaft 501 and/or prevent any build-up of dust and debris within the hollow metal shaft 501. Shaft assembly 500 also includes a plastic gear assembly 502 and a plastic pulley assembly 503. In some examples, and as described in more detail below, a shaft assembly such as shaft assembly 500 may be used to receive an input torque via plastic pulley 503, and to couple the torque to another shaft assembly via plastic gear 502. For clarity of description and explanation, FIG. 17 is reproduced as a planar cross-section in FIG. 18.

Figure 18:
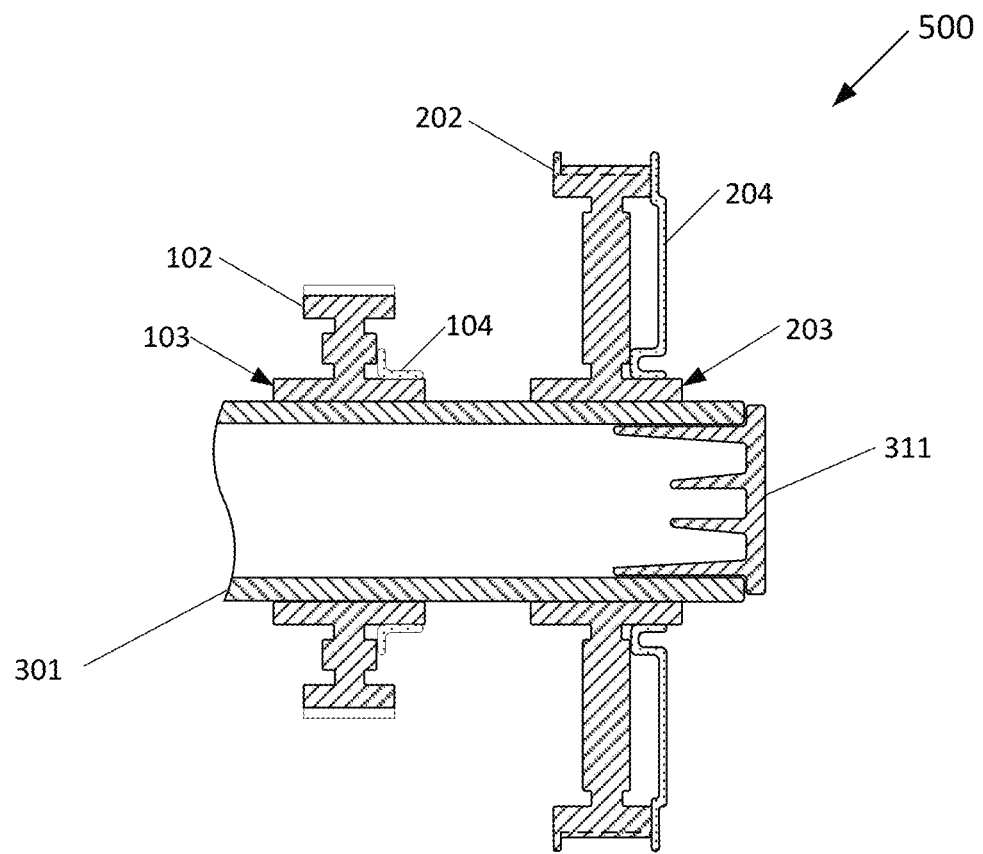
FIG. 18 is a planar view of the example shaft assembly of FIG. 17.

As illustrated in FIG. 18, example shaft assembly 500 is similar in all respects to a combination of example shaft assembly 200 and example shaft assembly 400. Example shaft assembly 500 includes a plastic gear 102 with a footing 103 and a metal compression ring 104 as previously described. Example shaft assembly 500 also includes a plastic pulley 202 with a footing 203 and a metal compression ring 204 as previously described. In the following, a shaft assembly such as shaft assembly 300, with two or more plastic ring elements, will be referred to as a "compound shaft assembly."

Figure 19:
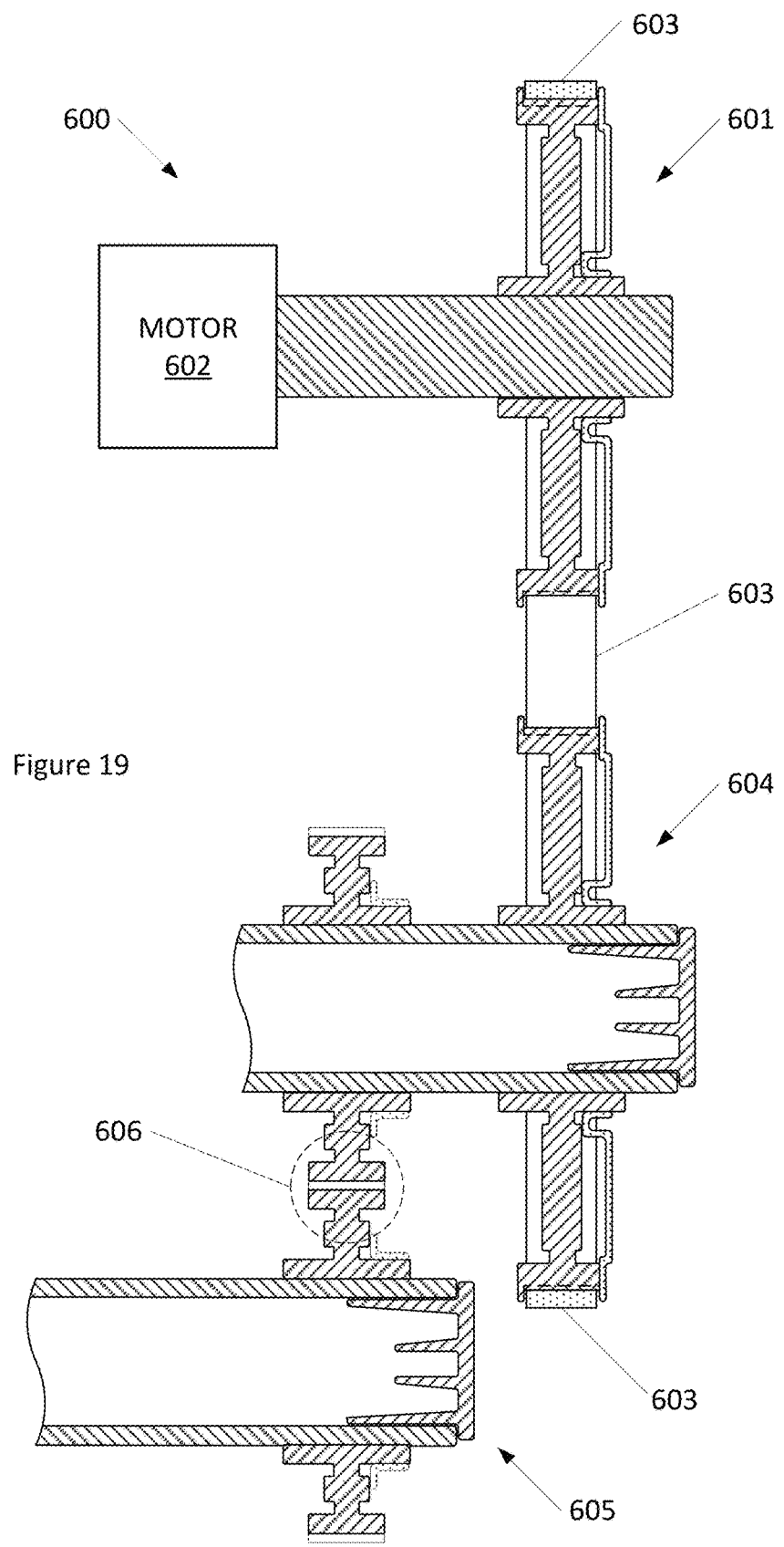
FIG. 19 illustrates an example system for coupling torque between shaft assemblies.

Turning now to FIG. 19, there is illustrated a cross-section of an example system 600 for coupling torque from a shaft assembly 601 driven by a motor 602, via a timing belt 603 to a compound shaft assembly 604, and thence to a shaft assembly 605 via a gear coupling 606 between the compound shaft assembly 604 and shaft assembly 605.

In the example of FIG. 19, illustrating an example system 600 for coupling torque from a motor through a pulley and gear assembly, shaft assembly 601 may be similar in all respects to shaft assembly 300, compound shaft assembly 604 may be similar in all respects to shaft assembly 500, and shaft assembly 605 may be similar in all respects to shaft assembly 200. Accordingly, details of those previous description are not repeated here. In FIG. 19, torque provided from motor 602 drives shaft assembly 601, which is coupled to compound shaft assembly 604 via coupling belt 603. Compound coupling shaft 604 couples the torque to shaft assembly 605 via a gear-to-gear engagement 606 between the compound shaft assembly 604 and the shaft assembly 605.

Figure 20:
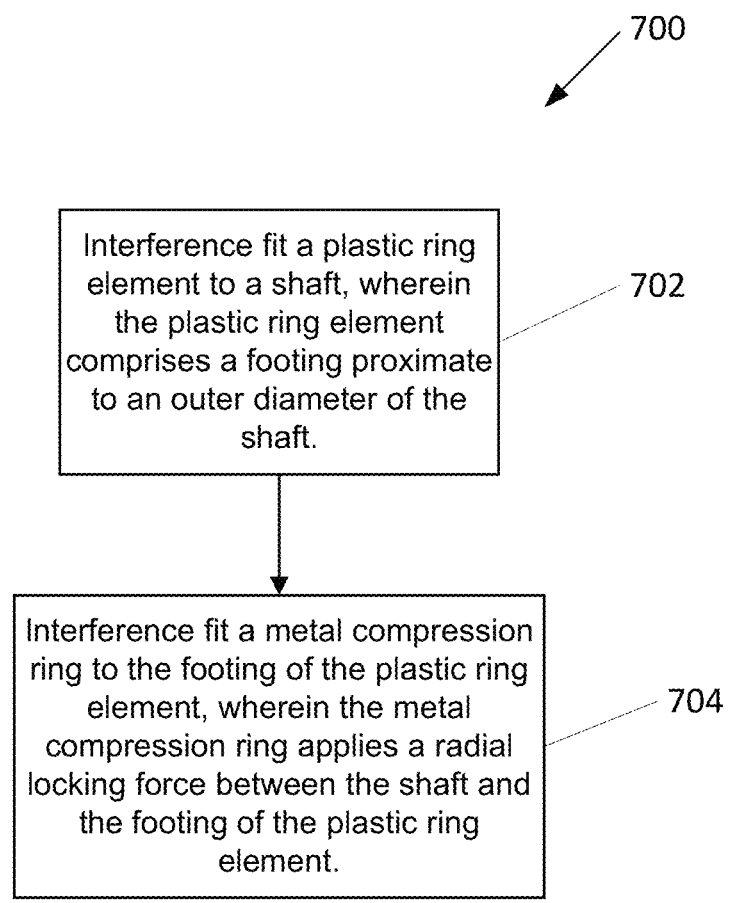
FIG. 20 is a flowchart illustrating an example method for providing locking torque between a metal shaft and a plastic gear element.

Turning now to FIG. 20, there is illustrated a flowchart for an example method 700 for assembling a shaft assembly according to the present disclosure. Operation 702 comprises interference-fitting a plastic ring element to a metal shaft, wherein the plastic ring element comprises a footing proximate to an outer diameter of the metal shaft. Operation 704 comprises interference-fitting a metal compression ring to the footing, wherein the metal compression ring applies a radial locking force between the footing and the metal shaft.

Thus, in accordance with various examples described herein, a disclosed shaft assembly includes a metal shaft, a plastic ring element interference-fitted to the metal shaft, where the plastic ring element comprises a footing proximate to an outer diameter of the metal shaft, and a metal compression ring is interference-fitted to the footing of the plastic ring element.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. An apparatus, comprising:
   a metal shaft;
   a plastic ring element interference-fitted to the metal shaft, the plastic ring element comprising a footing proximate to an outer diameter of the metal shaft; and
   a metal compression ring interference-fitted to the footing of the plastic ring element to apply a radial locking force between the footing and the metal shaft.

2. The apparatus of claim 1, wherein the plastic ring element comprises a gear.

3. The apparatus of claim 1, wherein the plastic ring element comprises a pulley.

4. The apparatus of claim 1, wherein a temperature coefficient of linear expansion of the plastic ring element is greater than a temperature coefficient of linear expansion of the metal compression ring.

5. The apparatus of claim 1, wherein the metal compression ring comprises an approximately L-shaped cross-section.

6. The apparatus of claim 1, wherein a cross-section of the metal compression ring comprises;
   an approximately U-shaped portion;
   a first linear portion extending radially from the U-shaped portion and offset from the U-shaped portion away from a centerline of the plastic gear ring; and
   a second linear portion extending radially from the first linear portion and offset from the first linear portion towards a centerline of the plastic gear ring, the second linear portion forming a race for the plastic ring element.

7. The apparatus of claim 1, wherein the radial locking force applied by the metal compression ring is greater than a decrease in the radial locking force due to material creep of the footing.

8. The apparatus of claim 1, wherein the radial locking force applied by the metal compression ring is greater than a decrease in the radial locking force due to differential thermal expansion between the metal shaft, the footing and the metal compression ring.

9. The apparatus of claim 1, wherein the plastic ring element is fabricated from one of a thermoplastic material or a thermosetting material.

10. The apparatus of claim 1, wherein the metal compression ring is fabricated from one of steel, stainless steel or aluminum.

11. A system, comprising:
   a first shaft assembly, comprising:
      a first metal shaft;
      a first plastic gear interference-fitted to the first metal shaft, the first plastic gear comprising a first footing proximate to an outer diameter of the first metal shaft;
      a first metal compression ring interference-fitted to the first footing to apply a first radial locking force between the first footing and the first metal shaft;
      a first plastic pulley interference-fitted to the first metal shaft, the first plastic pulley comprising a second footing proximate to the outer diameter of the first metal shaft; and
      a second metal compression ring interference-fitted to the second footing to apply a second radial locking force between the second footing and the first metal shaft;
   a motor comprising a second metal shaft and a second plastic pulley attached to the second metal shaft; and
   a coupling belt engaged with the first pulley and the second pulley to couple a torque from the motor to the first metal shaft.

12. The system of claim 11, further comprising:
   a second shaft assembly, comprising:
      a third metal shaft;
      a second plastic gear interference-fitted to the third metal shaft, the second plastic gear comprising a third footing proximate to an outer diameter of the third metal shaft; and
      a third metal compression ring interference-fitted to the third footing to apply a third radial locking force between the third footing and the third metal shaft.

13. The system of claim 12, wherein the second plastic gear is engaged with the first plastic gear, and wherein the torques from the motor is coupled to the second shaft assembly.

14. The system of claim 12, wherein the first pulley, the second pulley, the first gear and the second gear are fabricated from one of a thermoplastic material or a thermosetting material.

15. A method, comprising:
   interference-fitting a plastic ring element to a metal shaft, wherein the plastic ring element comprises a footing proximate to an outer diameter of the metal shaft; and
   interference-fitting a metal compression ring to the footing, wherein the metal compression ring applies a radial locking force between the footing and the metal shaft.

* * * * *